Dec. 18, 1962
G. P. MONET
RECOVERY OF ADIPIC ACID AND HEXAMETHYLENE DIAMINE FROM NYLON
Filed Sept. 9, 1959
3,069,465
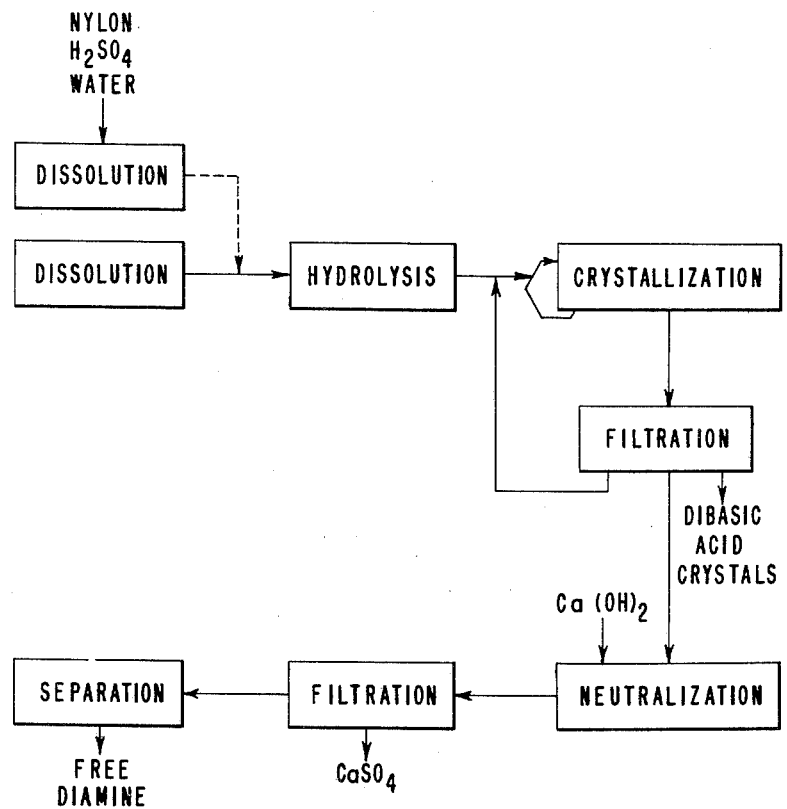

3,069,465
RECOVERY OF ADIPIC ACID AND HEXAMETH-
YLENE DIAMINE FROM NYLON
Gilbert Peter Monet, Wilmington, Del., assignor to E. I.
du Pont de Nemours and Company, Wilmington, Del.,
a corporation of Delaware
Filed Sept. 9, 1959, Ser. No. 838,831
2 Claims. (Cl. 260—537)

This invention relates to a process for recovering from nylon the salt-forming components from which it is made.

The normal operation of a nylon plant results in the unavoidable collection of waste fiber and polymer at various points in the process. This material is generally not suitable for remelting and extrusion into high grade fibers. It is therefore desirable that the salt-forming components of nylon be recovered from this material for the production of new polymer.

In the prior art, adipic acid and hexamethylenediamine have been recovered from nylon polymer by repeated hydrolysis of the polymer in sulfuric acid, recovering the adipic acid by crystallization after each hydrolysis step and the diamine by distillation after neutralizing the acid. In this process, the hydrolysis and crystallization of the adipic acid have to be carried out in a stepwise fashion, requiring frequent filtrations and a great deal of time for optimum recovery of the adipic acid. Such a process, then, is not efficient for handling the greatly increased volume of waste which has resulted from the continually increasing production of nylon fiber.

Accordingly, it is an object of this invention to provide an improved process for the recovery from nylon of its salt-forming components. Another object is to provide a process comprising continuous and rapid crystallization of adipic acid. A further object is to provide continuous and rapid crystallization of adipic acid in the form of crystals of such size as to promote rapid filtration of the crystals. Other objects will become apparent to those skilled in the art.

These objects are accomplished according to this invention by a process comprising continuously hydrolyzing nylon waste with an aqueous mineral acid of from about 30% to about 70% concentration, continuously feeding the resulting hydrolysate to a crystallization zone, continuously crystallizing the acid component and removing the crystals from the hydrolysate, continuously adding calcium hydroxide to the resulting mother liquor to substantially neutralize it and liberate at least about 95%, but less than 100%, of the diamine component, and separating this component from the mother liquor.

In order that continuous recovery may be accomplished, adipic acid crystals having an average diameter above about 40–50 microns must be provided. To provide such crystals, the crystallization is effected by continuously introducing the hot hydrolysate containing between about 10 and about 20% adipic acid into a crystallization vessel, maintaining a substantial volume of liquid in the vessel, agitating the contents of the vessel while maintaining an average temperature of about 20° to about 30° C. and removing slurry containing the adipic acid crystals from the tank at a rate sufficient to maintain the desired volume in the tank. Usually, the hydrolysate from the hydrolysis step contains more than 20% adipic acid. Optimum crystal size is achieved when the hydrolysate is diluted to 10 to 20% adipic acid concentration, preferably with filtrate obtained in the removal of the adipic acid crystals. The 20° to 30° C. temperature range is also critical in the production of adipic acid crystals of optimum size. This temperature range is preferably accomplished by vacuum cooling and where such cooling is utilized the hydrolysate is introduced well below the surface of the liquid to avoid too rapid evaporation of the water.

The slurry from the crystallization vessel is filtered to remove the adipic acid crystals, the filtrate containing the diamine sulfate being continuously neutralized by the addition of calcium hydroxide. The insoluble calcium sulfate formed in the neutralization reaction is removed by filtration and the diamine recovered and purified by distillation in the conventional manner. Preferably, the amount of calcium hydroxide added is such that 98 to 100% of the diamine sulfate is reacted to form free diamine, any excess of calcium hydroxide being avoided to prevent filtration difficulties.

A flow chart illustrating the exemplified embodiment of the claimed process has been shown in the accompanying drawing.

EXAMPLE

A total of 1,890 lbs. waste polyhexamethylene adipamide fibers (1700 lbs.) and polymer (190 lbs.) is added to 8,000 lbs. of water and 8,000 lbs. of concentrated (about 98%) sulfuric acid in a cylindrical tank of 12 ft. diameter and 8 ft. height. The solid material is completely dissolved in 2 hours after the addition of waste nylon is completed, the solution being maintained at 115° C. After the nylon waste is dissolved, the solution is pumped continuously through two hydrolysis tanks, each of which is divided into two equal compartments by a central divider which extends almost to the top of the tank. The solution passes successively through the four compartments thus provided, flowing into the bottom of one compartment of the first tank and overflowing into the second compartment. The solution then flows from the bottom of the second compartment to the other tank where it passes through the two compartments in like fashion, being maintained at a temperature of 115° C. during the eight-hour period required for passage through the hydrolysis tanks.

Supply of solution to the tanks is maintained by the use of two dissolving tanks, solution being pumped from one while waste nylon is being dissolved in the other. At the end of this period the hydrolysis is 99.7% complete and the solution contains 22% of adipic acid and 16% of diamine sulfate. The hydrolysate is pumped to a crystallization tank of 6 ft. diameter and 9 ft. height at a rate of 12 gals./min., being diluted by pumping into the pipeline sufficient volume of heated filtrate from the filtration of the adipic acid to reduce the concentration of adipic acid in the solution entering the crystallizer to 18%. The vessel is equipped with a loop consisting of a pipeline leading from the center of the bottom of the tank to a point on the side of the tank just below the liquid level and a pump in the line whereby the liquid in the tank is continuously circulated from the bottom of the tank to the top at a rate of 625,000 lbs./hr. The diluted hydrolysate at a temperature of 115° C. is introduced into the loop and is cooled by the liquid therein so that the liquid entering the top of the vessel from the loop is only 1° to 2° C. higher in temperature than the body of liquid in the tank which is maintained at an average temperature of 25° C. by reducing the pressure to 20 mm. Hg.

When the crystallization vessel is put into operation, it is filled with diluted hydrolysate to 70% of its capacity and this level is maintained thereafter by removing a sufficient amount of slurry from the bottom of the tank. This material is pumped into a storage tank where the temperature is maintained at 25° C. and the solution is agitated continuously. From the storage tank the slurry is pumped to a vacuum drum filter where the crude adipic acid crystals are removed. After purification by dissolving the crystals in water and recrystallizing them as before, a yield of 90% of the calculated amount, having a size between about 40 and about 200 microns, is obtained. Part of the filtrate is used to dilute the hydrolysate entering the crystallizer.

Calcium hydroxide is charged at a rate of 1,420 lbs./hr. into a slaking tank with water also being fed at 4,260 lbs./hr. The resulting slurry is fed at a rate of 5,680 lbs./hr. into a neutralizer tank containing the remaining filtrate which contains diamine sulfate, free sulfuric acid and minute quantities of adipic acid. This amount is sufficient to neutralize the free sulfuric acid and to liberate about 99% of the diamine. A conventional conductivity cell in combination with a controller-recorder is used to control the addition of calcium hydroxide. The neutralization of the solution is characterized by a rapid drop in conductivity as the free acid and diamine sulfate are neutralized and a slight rise in conductivity as excess calcium hydroxide is added beyond the point at which all the diamine has been liberated. The reaction is controlled to provide as complete liberation of diamine as possible without adding excess calcium hydroxide. To accomplish this, the minimum point in the conductivity curve is determined once every eight hours by adding a momentary excess of calcium hydroxide. The conductivity controller set-point is adjusted to ½ a scale unit (500 micromhos/cm.$^3$) above the minimum. This adjustment compensates for the build-up of scale on the electrodes and insures against the addition of excess calcium hydroxide.

After neutralization of the solution, the insoluble calcium sulfate formed in the reaction is filtered off by means of a vacuum drum-type filter and the free diamine separated and purified by vacuum distillation in the conventional manner. The adipic acid and diamine components recovered are suitably pure for the production of filaments of high quality.

The process of this invention makes possible the continuous crystallization and filtration of adipic acid at a high rate, by controlling the adipic acid concentration in the crystallizer feed within critical limits, whereby the formation of fine crystals which make filtration difficult is inhibited.

Hydrolysis of the nylon waste must be carried out in one continuous step rather than in any plurality of steps. The preferred acid for use in hydrolysis is sulfuric acid due to its ease of removal as an insoluble salt, however, other strong mineral acids such as hydrochloric may be used. The acid concentration may be in the range of 30 to 70%, but preferably is in the range of 40 to 50%. Preferably, 2.0 to 2.7 mols of sulfuric acid is used for each mol of nylon and the optimum ratio is 2.3 mols of sulfuric per mol of nylon.

Although temperatures of 75 to 140° C. may be employed in the hydrolysis step, it is preferable to carry out the reaction at the boiling point of the solution which, under optimum conditions, will be in the range of 110 to 120° C. The time required to effect substantially complete hydrolysis will, of course, vary depending upon the temperature and other conditions but when aqueous sulfuric acid is used at the boiling point, hydrolysis should normally be complete in about 8 hours. In order to obtain maximum efficiency in the recovery system, sufficient nylon waste should be used to provide a concentration of 20 to 25% adipic acid in the hydrolysate.

Adipic acid crystals of appropriate size are provided by adjusting the adipic acid concentration in the hydrolysate to 10% to 20% and lowering the temperature of the hydrolysate to about 20 to 30° C. The latter is most readily effected by pumping the hydrolysate continuously into a tank which is maintained in a substantially filled condition at the desired temperature. The liquid in the tank may be cooled in any desired manner but preferably by applying a vacuum to the tank. If vacuum cooling is employed, the hot hydrolysate should be introduced well under the surface of the liquid in order to avoid rapid evaporation of the hot liquid, since this contributes to the formation of fine crystals which do not filter easily. For best results, the temperature and concentration of the diluted hydrolysate should be such that the solution is not supersaturated with adipic acid when introduced into the crystallizer. For this purpose, temperatures of at least about 90° C. are preferred.

The slurrry, containing adipic acid crystals, in the crystallization vessel should be agitated sufficiently to provide rapid mixing of the liquid fed into the crystallizer with the contents of the tank. Slurry containing adipic acid crystals is removed from the bottom of the tank at substantially the same rate that the hydrolysate or diluted hydrolysate is added. Preferably, the slurry is pumped into the storage tank where it is maintained at substantially the same temperature as the crystallizer to permit further crystal growth. The slurry is then filtered in any suitable manner, but preferably vacuum drum-type filters are employed to effect rapid filtration. Preferably, part of the filtrate is employed to dilute the hydrolysate being fed into the crystallizer. The remainder of the hydrolysate is then pumped to a neutralization tank.

The term neutralization as used herein refers not only to the neutralization of the free acid in the mother liquor from the crystallization step, but also to the addition of sufficient free alkali to liberate substantially all of the diamine from the diamine salt formed earlier with mineral acid. Neutralization is accomplished by adding calcium hydroxide in the form of readily available lime. The calcium hydroxide reacts with the free sulfuric acid to form cacium sulfate and water and with the diamine sulfate to form calcium sulfate and free diamine. The calcium sulfate, being of low solubility in the solution, is substantially all precipitated and removed by filtration. The free diamine is then separated from the solution and purified by vacuum distillation in the conventional manner.

The process of this invention may be applied to any linear condensation polymer of the diamine-dibasic acid type, as for instance, those described in U. S. Patents 2,130,523 and 2,130,948.

I claim:

1. A process for recovering adipic acid and hexamethylene diamine from polyhexamethylene adipamide, said process comprising the steps of continuously: hydrolyzing said adipamide in aqueous sulfuric acid of from about 30% to about 70% concentration, at a temperature of from 75–140° C.; discharging the hydrolysate to a crystallization zone provided with a recirculation line through which slurry is pumped from adjacent the bottom to a point beneath the surface level of said zone, said hydrolyzate being discharged into said line, the contents of said zone being maintained at a temperature of about 25° C.; removing slurrry from said zone and filtering adipic acid crystals therefrom, leaving a mother liquor; diluting the hydrolysate before its discharge into said recirculation line with a heated portion of the mother liquor, thereby adjusting the adipic acid concentration to about 10% to about 20% by weight of the hydrolysate, said diluted hydrolysate being maintained at a temperature level of at least 90° C.; neutralizing the remaining mother liquor with less than an excess of calcium hydroxide, thus liberating from 98–100% of the hexamethylene diamine therein; filtering calcium sulfate from the neutralized liquor; and separating the free diamine therefrom.

2. A process for recovering adipic acid and hexamethylene diamine from polyhexamethylene adipamide, said process comprising the steps of continuously: dissolving said adipamide in a first vessel containing aqueous sulfuric acid of from about 30% to about 70% concentration, at a temperature of from 75–140° C.; pumping the resulting solution from said first vessel through serially connected hydrolysis compartments while dissolving additional adipamide in a second vessel also adapted for communication with said compartments; discharging the resulting hydrolysate to a crystallization zone provided with a recirculation line through which slurry is pumped from adjacent the bottom to a point beneath the surface level of the zone, said hydrolysate being discharged from the last of said compartments into said line, the contents of said zone being maintained at a temperature of about 25° C.; removing slurry from said zone and filtering adipic acid crystals therefrom, leaving a mother liquor; diluting the hydrolysate before its discharge into said recirculation line with a heated portion of said mother liquor, thereby adjusting the adipic acid concentration to about 10% to about 20% by weight of the hydrolysate, said diluted hydrolysate being maintained at a temperature of at least 90° C.; neutralizing the remaining mother liquor with less than an excess of calcium hydroxide, thus liberating from 98–100% of the hexamethylene diamine therein; filtering calcium sulfate from the neutralized liquor; and separating the free diamine therefrom.

References Cited in the file of this patent

UNITED STATES PATENTS 2,407,896    Meyers _____ Sept. 17, 1946

OTHER REFERENCES

"Reclaiming Nylon," Chemical Industries 55, 376–378 (1944). (Copy in Scientific Library; Photocopy in Div. 38, 260–537.)